United States Patent
Zhu et al.

(10) Patent No.: US 10,210,638 B2
(45) Date of Patent: Feb. 19, 2019

(54) VISUALIZATION INTEGRATION OF GRAPHICAL LOGGING CONTENT

(71) Applicant: Schlumberger Technology Corporation, Sugar Land, TX (US)

(72) Inventors: Qingfeng Zhu, Sugar Land, TX (US); Jean Seydoux, Sugar Land, TX (US); Ettore Mirto, Sugar Land, TX (US); Denis Heliot, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 2 days.

(21) Appl. No.: 15/098,723

(22) Filed: Apr. 14, 2016

(65) Prior Publication Data

US 2017/0301116 A1   Oct. 19, 2017

(51) Int. Cl.
*G06T 11/20* (2006.01)
*G06T 7/00* (2017.01)
*G06T 7/40* (2017.01)

(52) U.S. Cl.
CPC .......... *G06T 11/206* (2013.01); *G06T 7/0004* (2013.01); *G06T 7/408* (2013.01)

(58) Field of Classification Search
CPC ........................... G06T 11/206; G06T 7/0004
See application file for complete search history.

(56) References Cited

U.S. PATENT DOCUMENTS

| | | | |
|---|---|---|---|
| 9,091,140 B1* | 7/2015 | Selman | E21B 7/04 |
| 2005/0188333 A1* | 8/2005 | Hunleth | G06F 3/0481 |
| | | | 715/860 |
| 2007/0199721 A1* | 8/2007 | Givens | G06Q 10/06 |
| | | | 166/382 |
| 2009/0198447 A1* | 8/2009 | Legendre | G01V 1/50 |
| | | | 702/11 |
| 2016/0260236 A1* | 9/2016 | Fogarty | G06T 3/40 |

* cited by examiner

*Primary Examiner* — Samantha (Yuehan) Wang

(57) ABSTRACT

A method for integrating graphical logging content of a subterranean wellbore includes processing a plurality of digitized display images and relevant context information to generate a single synchronized display image including representations of each of the plurality of display image. The plurality of digitized display images and relevant context information are received at a central processor from a corresponding plurality of source tools or source processors. The display images are representative of subterranean wellbore conditions.

20 Claims, 4 Drawing Sheets
(2 of 4 Drawing Sheet(s) Filed in Color)

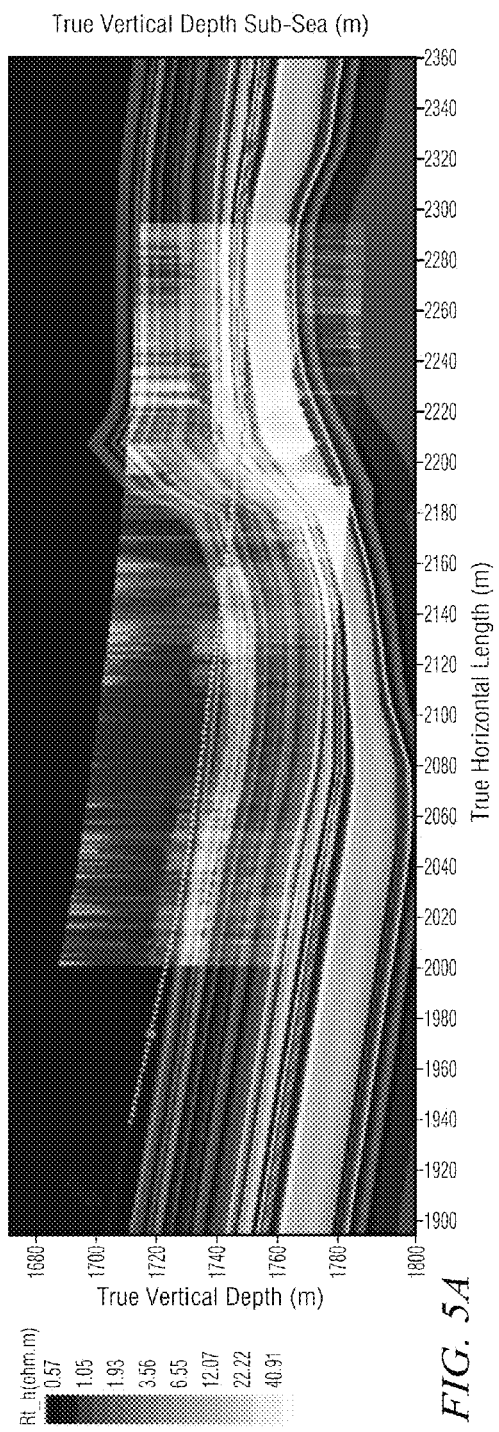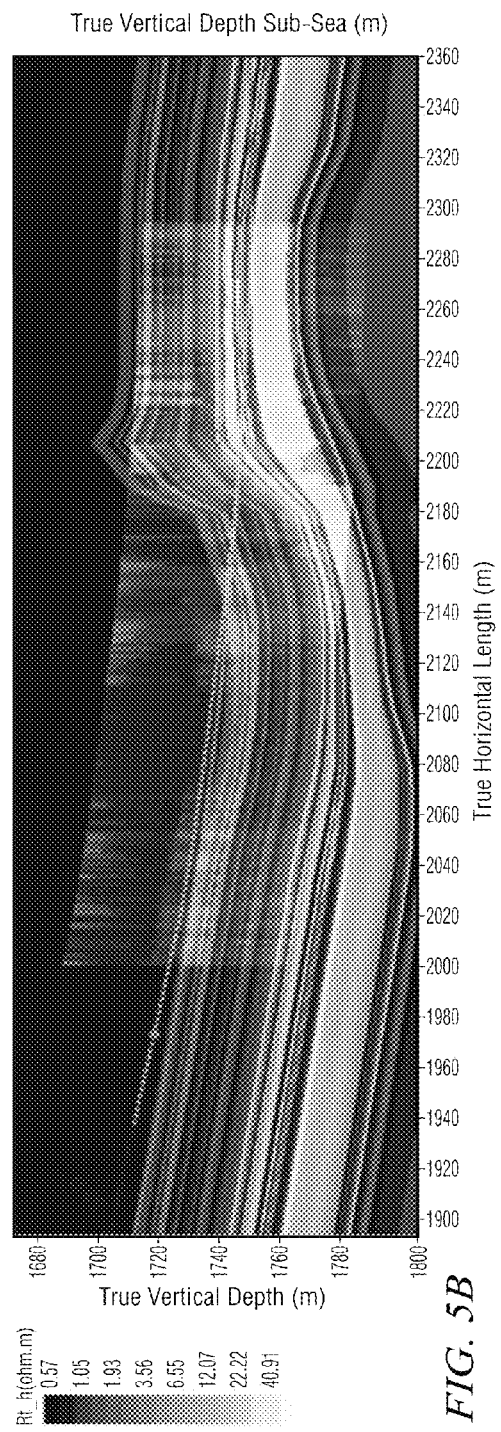
FIG. 5A
FIG. 5B

US 10,210,638 B2

VISUALIZATION INTEGRATION OF GRAPHICAL LOGGING CONTENT

CROSS REFERENCE TO RELATED APPLICATIONS

None.

FIELD OF THE INVENTION

Disclosed embodiments relate generally to interpretation and display of downhole content and more particularly to a method for integrating graphical displays of various logging content.

BACKGROUND INFORMATION

Oil and gas drilling operations are known to be expensive and risky such that timely and right decision making is needed during drilling. To that end many types of wellbore measurement techniques are commonly employed during a drilling operation to measure a wide variety of parameters. These parameters may include those related to the physical properties of the wellbore itself (e.g., temperature, pressure, fluid content, wellbore geodetic trajectory), construction of the wellbore (e.g., torque and/or axial force applied to a drill bit), and the formations surrounding the wellbore (e.g., resistivity, acoustic velocity, neutron interactive properties, density, and pore fluid pressure and composition).

In certain drilling operations geoscientists, drilling engineers, and other personnel in different locations around the world may collaborate to interpret and analyze the measured wellbore parameters. In such operations visualization of the measured parameters can be problematic. For example, various downhole measurement tools (such as logging tools) utilize different and incompatible software packages. Moreover, distinct software is also commonly used for drilling operation execution, data streaming and monitoring, geological modeling, petro-physical reservoir characterization, and other applications. While these software applications are generally capable of integrating and displaying various types of data, they are not generally compatible with one another. Moreover, reformatting data for integration into other software packages is time consuming and fraught with difficulties (including the potential to compromise data integrity). Loading and integrating data from the various sources into a separate software application would require a massive effort and is unfeasible.

There is a need for a system that integrates graphical visualization from heterogeneous data sources and/or software applications and creates a current, synchronized graphical canvas of the data.

SUMMARY

A method for integrating graphical logging content of a subterranean wellbore is disclosed. The method includes processing a plurality of digitized display images and relevant context information to generate a single synchronized display image including representations of each of the plurality of display images. The plurality of digitized display images and relevant context information are received at a central processor from a corresponding plurality of source tools or source processors. The display images are representative of measured or modeled subterranean wellbore conditions.

The disclosed embodiments may provide various technical advantages. For example, the disclosed methods enable digitized images from various software packages to be combined into a single synchronized display image. The combined image may advantageously benefit oilfield services operations by improving real-time collaborations and situational awareness during a drilling operation.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the disclosed subject matter, and advantages thereof, reference is now made to the following descriptions taken in conjunction with the accompanying drawings, in which:

FIGS. 5A and 5B depict first and second examples of a synchronized display image generated at 106 of method 100 in FIG. 2.

DETAILED DESCRIPTION

Figure 1:
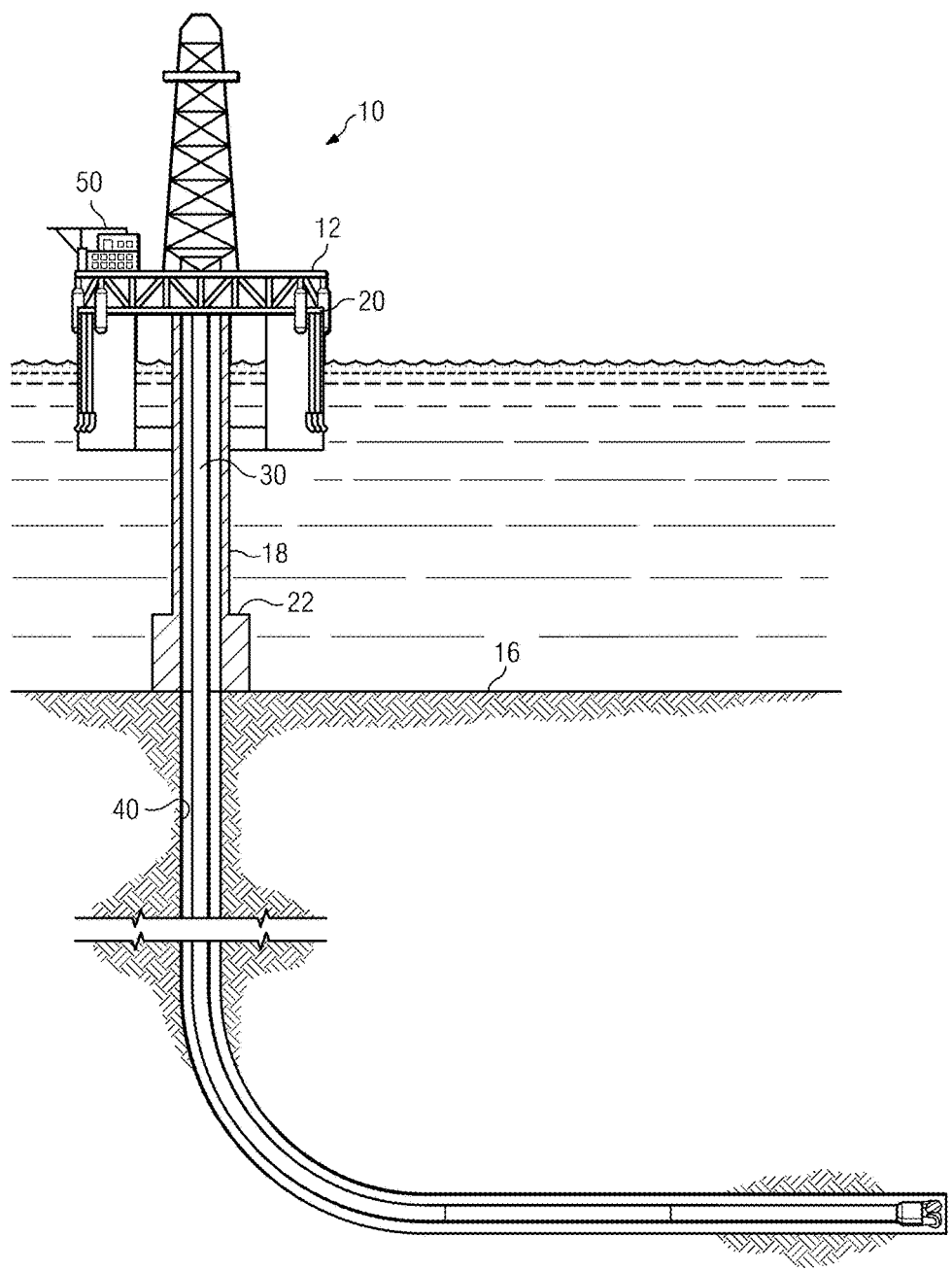
FIG. 1 shows an example drilling operation.

FIG. 1 depicts a drilling rig 10 suitable for using various method and system embodiments disclosed herein. In the depicted example, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus (not shown) for raising and lowering a drill string 30, which, as shown, extends into wellbore 40. The drill string 30 may include substantially any suitable downhole tools such as a drill bit, a steering tool, a downhole drilling motor, a downhole telemetry system, a reaming tool, a logging while drilling tool, a measurement while drilling tool, and the like. The disclosed embodiments are not limited in regards to such tool deployments.

In the depicted example, drilling rig 10 may include a command module (depicted schematically at 50). The command module 50 may include various computerized instruments configured for controlling and/or interfacing with a drilling or a logging operation in the wellbore. In one example embodiment, the command module 50 may include a central processor such as is described in more detail below with respect to FIGS. 2, 3A, and 3B, however, the disclosed embodiments are in no way limited in this regard as the central processor is not necessary located on the rig (or even in the vicinity of the rig).

It will be understood by those of ordinary skill in the art that the deployment illustrated on FIG. 1 is merely an example. It will be further understood that disclosed embodiments are not limited to use with a semisubmersible platform 12 as illustrated on FIG. 1. The disclosed embodiments are equally well suited for use with any kind of subterranean drilling operation, either offshore or onshore. Moreover it will also be understood that the disclosed embodiments are not limited to drilling operations, but may be used in conjunction with other non-drilling operations, for example, including wireline, slick line, and coiled tubing operations. Moreover, the disclosed embodiments are not limited to being used concurrently with drilling or logging operations, but may be suitably used before or after such operations.

Figure 2:
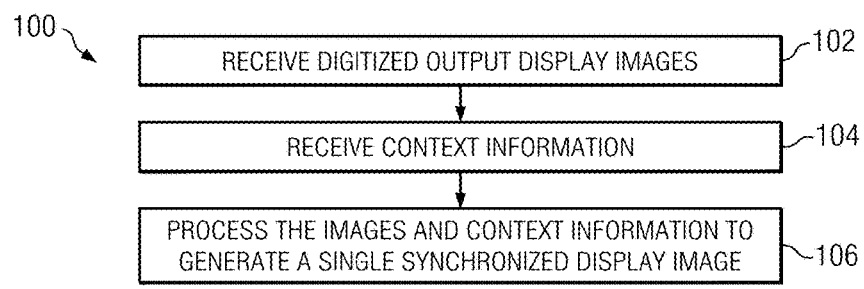
FIG. 2 depicts a flow chart of one disclosed method embodiment.

FIG. 2 depicts a flow chart of one disclosed method 100 for generating a synchronized display. A plurality of digitized output display images is received at 102 from a corresponding plurality of source tools (or processors), e.g., logging while drilling or measurement while drilling tools and the like. The source tools may include the downhole tools themselves or an upstream processing unit that receives raw data from the source tool and generates the output display images. The source tool may further include various computer modeling routines used to model wellbore parameters. Relevant context information is also received at 104. Such context information may include, for example, a geological index range (e.g., the range of values of a wellbore parameter), a graphical coordinate/pixel range (e.g., vertical and horizontal dimensions of a plot), a time or time range of data acquisition or image generation, a range of wellbore depths, source software information, a background color, as well as operation related information such as the well site, drilling operator, and the relevant logging tool information. The relevant context information and the plurality of display images may then be processed to combine and/or synchronize the plurality of display images into a single synchronized display image at 106.

For example, based on geological coordinate information and graphical coordinate range, combining and/or synchronizing the images may include cropping, scaling, flipping along one or more axes, re-coloring, and overlaying or blending one or more of the images. Such image integration may be advantageously accomplished based on the digitized images and their relevant context information and does not include processing the source data that was used to generate the original display images. Moreover, the source data is generally not received at 102. Receiving and/or processing the source data can be problematic as described above in the background section of this disclosure.

Figure 3A:
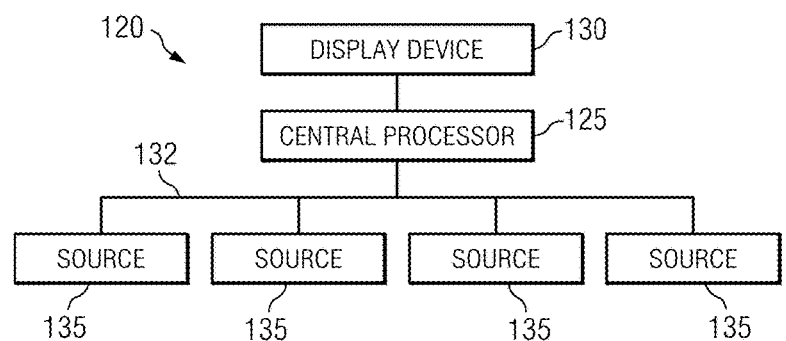
FIGS. 3A and 3B depict example systems for practicing the method of FIG. 2.

FIG. 3A depicts one example system 120 for practicing the method 100 shown on FIG. 2. A central controller/processor 125, such as a personal computer or other suitable processing device, is in electronic communication with a plurality of source tools (or processors) 135. By electronic communication it is meant that the controller/processor is disposed to receive the plurality of digitized output displays from the corresponding source tools 135 (the electronic communication is schematically depicted at 132). Such communication may include hardwired or wireless connectivity. Moreover, such communication may include a physical image transfer, for example, using a flash memory or magnetic memory device. The disclosed embodiments are not limited in these regards. System 120 further includes a display device 130 such as a flat panel display or a printer. Again, the disclosed embodiments are not limited to any particular type of display device so long as the display device is suitable for displaying the synchronized display image generated at 106 of method 100 (FIG. 2).

Figure 3B:
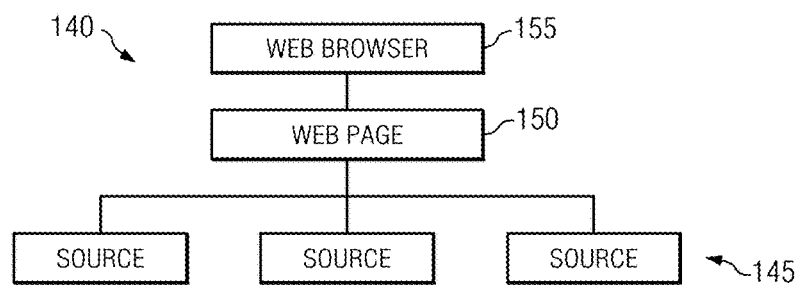

FIG. 3B depicts another example system 140 for practicing the method 100 shown on FIG. 2. FIG. 3B depicts a three-layer system including a first layer 145 having a plurality of existing image generating applications, a second layer 150 including an application such as a web server (or page) and interface for generating the combined and/or synchronized image based on the relevant context information via method 100, and a third layer 155 including an external system configured to access the second layer 150 (such as a web browser configured to access a web server or web page.

With continued reference to FIGS. 2, 3A, and 3B, the disclosed embodiments may be implemented using existing downhole tools and software applications. For example, a central processor 125 (FIG. 3A) or web server 150 (FIG. 3B) may be configured to issue a software function call such that it receives the images and relevant context information at 102 and 104 of method 100 (FIG. 2). An operator may interface with the central processor 125 or web server 150 (FIGS. 3A and 3B) to customize integration of the synchronized image at 106 of method 100, for example, by selecting layout features (such as side-by-side or overlay layout), graphical settings (such as a transparency setting or a display order), and the data range to be displayed. There is no limit on the software applications that may be used in the first layer 145 or the plurality of source tools 135. For example, the existing software applications may be distinct software packages used in corresponding downhole tools that are produced by different companies. Moreover, the software applications need not run on the same computer or even in the same location. Nor is there any need to share (or otherwise output) raw data with other applications as the method only requires the graphical image and relevant context data. It will be further understood that the integrated image may be viewed using substantially any suitable display device 135 (third layer 155) such as a desktop or portable computer, a tablet computer, or a smart phone. The disclosed embodiments are not limited in any of these regards.

Figure 4A:
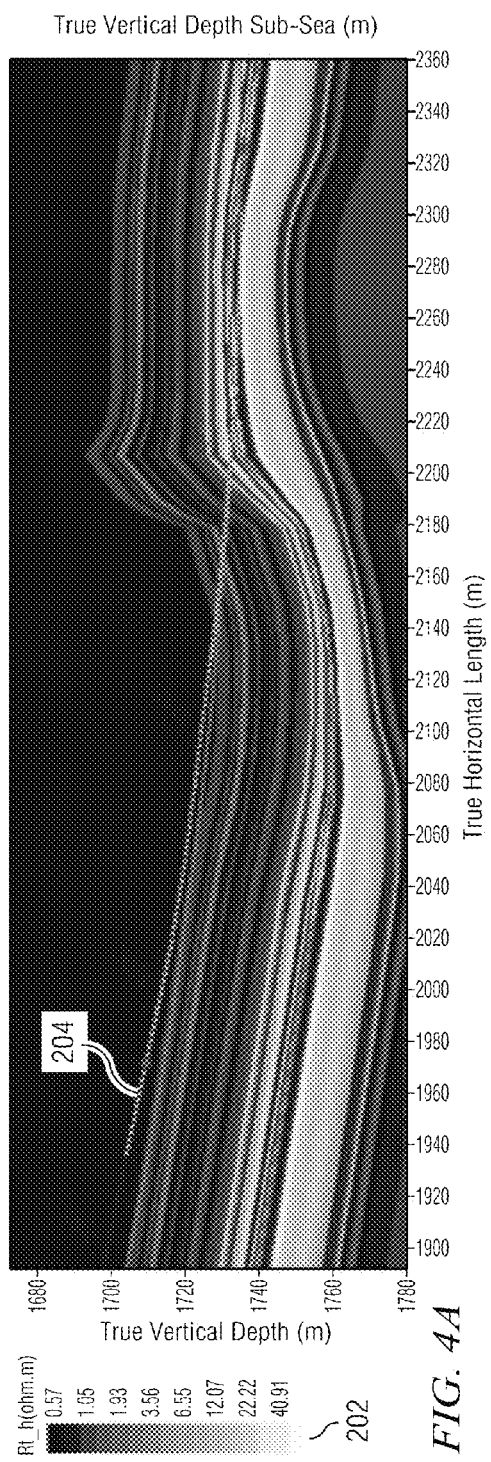
FIGS. 4A and 4B depict example output display images received at 102 of method 100 in FIG. 2.
Figure 4B:
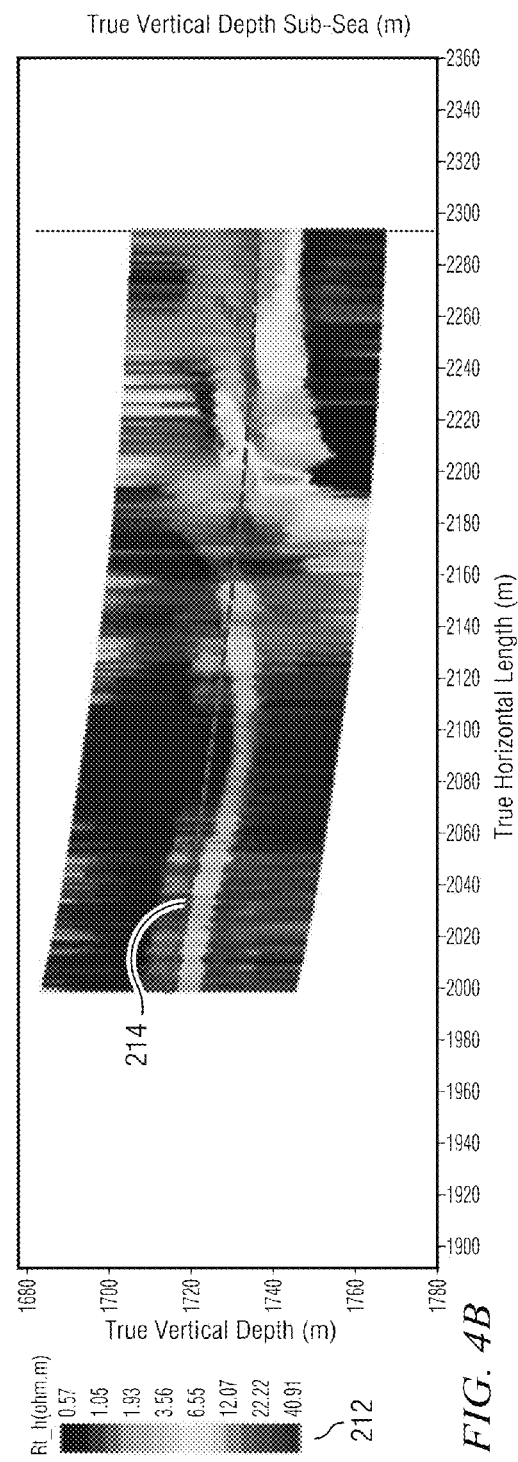

The following example, depicted on FIGS. 4A, 4B, 5A and 5B, further illustrates the disclosed embodiments but, of course, should not be construed as in any way limiting its scope. In this example, FIGS. 4A and 4B depict the original digitized output display images received at 102 of method 100 (FIG. 2). FIGS. 5A and 5B depict first and second examples of a synchronized display image generated at 106 of method 100 (FIG. 2).

Logging and other data used in oil and gas well drilling are commonly displayed with respect to a depth or time index (e.g., logging data is commonly displayed with respect to the true vertical depth or measured depth of the wellbore). Moreover, as known to those of ordinary skill in the art, depth and time are commonly related to one another via a rate of penetration of drilling. True vertical depth and time are commonly related via a rate of penetration of drilling and a wellbore inclination. When a source tool or processor is generating a visual display for a certain data set, the canvas dimensions and the graphical coordinate to display the physical data range are commonly known or calculated from the data set. In other words, the above described context information is generally known, assumed, or computed in order to generate the original display image. In general, the combined/synchronized image may be generated based on the ranges of the relevant parameters, for example, the ranges of the vertical and horizontal axes (if the data is presented in plot form) and the range of the color or greyscale contour.

FIG. 4A depicts a pseudo color contour plot of horizontal resistivity Rt_h in brown contours versus true vertical depth (TVD) on the vertical axis and true horizontal length (THL) on the horizontal axis. The horizontal resistivity scale is depicted on the bar 202 located on the left hand side of the plot. The display image was generated using well placement planning software. A planned well trajectory is also shown at as a green dotted line at 204 with corresponding measured depth values along the wellbore in green text.

FIG. 4B depicts a pseudo color contour plot of horizontal resistivity Rh in red yellow green blue pseudo color contours versus TVD on the vertical axis and THL on the horizontal axis. The horizontal resistivity scale is depicted on the bar 212 located on the left hand side of the plot. The display image depicts logging while drilling data obtained using Geosphere®, a reservoir mapping while drilling service available from Schlumberger Technology Corporation. The actual well trajectory (as drilled) is also shown as a red line 214 with corresponding measured depth values along the wellbore in black text.

In order to generate a combined and synchronized image of the display images depicted on FIGS. 4A and 4B, certain relevant context information was required (in this example). For the display image shown on FIG. 4A, the relevant context information included the range of horizontal resistivity values (the contours) in each of the display images as shown in the bar scale at 202 as well as the range of TVD and THL from the vertical and horizontal axes of the plot. For the display image shown on FIG. 4B, the relevant context information included the range of horizontal resistivity values (from lower to upper values) in each of the display images as shown in the bar scale at 212 as well as the range of TVD and THL (from lower to upper values) obtained from the vertical and horizontal axes of the plot. Based on the relevant context information, the digitized display images were scaled and properly aligned with one another so as to provide for better visualization and comparison of the data represented in each image.

The display images, e.g., as depicted on FIGS. 4A and 4B, may be combined and synchronized using various layouts (e.g., side by side, over under, or overlaid with one another). The images may be cropped, scaled, and/or blended with the level of control given to the software end-user such that image generation is interactive (e.g., the end user may have interactive control of image transparency when the images are overlaid with one another or the locations of the images may be adjustable side by side or over under locations on top of each other).

FIGS. 5A and 5B depict example embodiments of combined (synchronized) display images in which the display image depicted on FIG. 4B is overlaid with the image depicted on FIG. 4A. In FIGS. 5A and 5B, display image from FIG. 4B was scaled so that the TVD and THL ranges were aligned with those of the image from FIG. 4A. The transparency of the display image was then set to 0.8 for FIG. 5A and 0.5 for FIG. 5B. FIGS. 5A and 5B enable a drilling operator (or other personnel) to readily compare the measured horizontal resistivity values depicted on FIG. 5B with the modeled values depicted on FIG. 5A. Moreover, the relative location of the actual well path with respect to the planned well path may also be readily compared (by comparing the positions of the actual well trajectory 214 and the planned well trajectory 204).

It will be understood that the disclosed embodiments may advantageously benefit oilfield services operations by improving real-time collaborations and situational awareness. For example, Table 1 lists various products and services available from Schlumberger Technology Corporation (the assignee) that may be used in a directional drilling job and from which images may be integrated to provide real-time visualization integration. Such integration may enable drilling operators to monitor progress and make informed decisions regarding a drilling operation.

TABLE 1

| Visualization/ Activity | Creator Role/ Specialist | Software Product |
|---|---|---|
| Seismic curtain section | Geologist | Petrel, with E&P company proprietary data |
| Well Placement interpretation | Well placement engineer | Schlumberger licensed module, Petrel |
| Driller's view | Directional Driller | Drilling Office |
| Petrophycics interpretation | Petrophysisist | Techlog |
| Acquisition logs | Field Engineer | Maxwell |
| Mud logs | Mud logging Engineer | Schlumberger Geoservices software |

Although methods and systems for visual integration of graphical logging content have been described in detail, it should be understood that various changes, substitutions and alternations can be made herein without departing from the spirit and scope of the disclosure as defined by the appended claims.

What is claimed is:

1. A method for integrating graphical logging content of a subterranean wellbore, the method comprising:
   (a) receiving two digitized display images at a central processor, the two digitized display images being received from a corresponding plurality of source tools or source processors, the two digitized display images representative of measured or modeled subterranean wellbore conditions and each of the two digitized display images comprising x and y dimensions;
   (b) receiving relevant context information about each of the two digitized display images at the central processor wherein the relevant context information comprises, for each of the two digitized display images, range information for the x and y dimensions and graphical coordinate/pixel range information; and
   (c) causing the central processor to process at least one of the two digitized display images and the relevant context information to generate a single synchronized digitized display image including representations of the two digitized display images received in (a) wherein to process comprises scaling and aligning based at least in part on the range information for the x and y dimensions, and
   wherein one of the two digitized display images comprises representations of modeled resistivity of a region and wherein the other of the two digitized display images comprises representations of actual logging while drilling resistivity of the region, and wherein the representations of modeled resistivity comprise a representation of a modeled trajectory of a bore and wherein the representations of actual logging while drilling resistivity comprise a representation of an actual trajectory of the bore.

2. The method of claim 1, wherein at least one of the plurality of display images comprises a contour plot including a wellbore property plotted with respect to vertical and horizontal depths of the subterranean wellbore.

3. The method of claim 2, wherein the contour plot comprises a color or pseudo-color contour plot.

4. The method of claim 3, wherein the relevant context information comprises ranges of vertical and horizontal axes of the plot, as the y and the x dimensions, and a range of the color or pseudo color contours in the plot.

5. The method of claim 1, wherein the relevant context information comprises at least one of a geological index range, a time or time range of data acquisition or image generation, and a background color.

6. The method of claim 1, wherein (c) comprises at least one of flipping along one or more axes, re-coloring, and overlaying or blending one or more of the images received in (a).

7. The method of claim 1, wherein an operator interfaces with the central processor in (c) to select at least one of layout features, graphical settings, and a data range of the synchronized display image.

8. The method of claim 1, wherein to process comprises processing pixel data such that to process does not include processing raw data as used to generate the two digitized display images received in (a).

9. The method of claim 8, wherein the raw data is not received at the central processor.

10. The method of claim 1, wherein the scaling causes one of the two digitized display images to comprise an area that is less than an area of another one of the two digitized display images.

11. The method of claim 1, further comprising cropping one of the two digitized display images to generate a cropped digitized display image, wherein the single synchronized digitized display image comprises representations of the cropped digitized display image overlaid on representations of the other digitized display image, and wherein the representations of the cropped digitized display image are rendered with a level of transparency as to provide display of at least a portion of the representations of the other digitized display image.

12. The method of claim 1 comprising adjusting transparency of at least one of the representations of the two digitized display images.

13. The method of claim 1, wherein one of the x and y axes comprises measured depth or true vertical depth.

14. The method of claim 1, wherein the x and y axes comprise measured depth and true vertical depth.

15. The method of claim 1, wherein one of the two digitized display images comprises a representation of a modeled trajectory of a bore and the other of the two digitized display images comprises a representation of an actual trajectory of the bore and wherein the single synchronized digitized display image comprises an overlay of at least a portion of the representation of the modeled trajectory and at least a portion of the representation of the actual trajectory.

16. A system for integrating graphical logging content of a subterranean wellbore, the system comprising:

a central controller in electronic communication with a plurality of source tools such that it is configured to receive a plurality of digitized display images from the source tools, the controller further configured to process at least one of the plurality of display images and relevant context information about each of the plurality of display images to generate a single synchronized display image including representations of the plurality of received digitized display images, the digitized display images representative of measured or modeled subterranean wellbore conditions and each of the plurality of digitized display images comprising x and y dimensions, wherein the relevant context information comprises, for each of the plurality of digitized display images, range information for the x and y dimensions and graphical coordinate/pixel range information, and wherein to process comprises scaling and aligning based at least in part on the range information for the x and y dimensions, and wherein one of the two digitized display images comprises representations of modeled resistivity of a region and wherein the other of the two digitized display images comprises representations of actual logging while drilling resistivity of the region, and wherein the representations of modeled resistivity comprise a representation of a modeled trajectory of a bore and wherein the representations of actual logging while drilling resistivity comprise a representation of an actual trajectory of the bore; and a display device in electronic communication with the central controller, the display device configured to display the synchronized display image.

17. The system of claim 16, wherein the central controller comprises a web server and the display device comprises an external device configured to access the web server.

18. The system of claim 16, wherein the external device comprises a personal computer, a laptop computer, a tablet computer, or a smart phone.

19. The system of claim 16, wherein the scaling causes one of the two digitized display images to comprise an area that is less than an area of another one of the two digitized display images.

20. The system of claim 16, wherein one of the x and y axes comprises measured depth or true vertical depth.

* * * * *